(12) United States Patent
Koschitzky

(10) Patent No.: US 6,235,142 B1
(45) Date of Patent: May 22, 2001

(54) METHOD OF PRODUCING LAMINATED SHINGLE

(75) Inventor: Henry Koschitzky, Downsview (CA)

(73) Assignee: IKO Industries Ltd., Toronto (CA)

( * ) Notice: Subject to any disclaimer, the term of this patent is extended or adjusted under 35 U.S.C. 154(b) by 0 days.

(21) Appl. No.: 09/357,837

(22) Filed: Jul. 21, 1999

Related U.S. Application Data

(60) Provisional application No. 60/094,158, filed on Jul. 27, 1998.

(51) Int. Cl.[7] .................................................. B32B 31/18
(52) U.S. Cl. .......................... 156/260; 156/264; 156/270; 156/271; 156/512
(58) Field of Search .................................. 156/250, 260, 156/264, 270, 271, 512; 83/920; 427/186, 187; 52/518; 428/141, 143

(56) References Cited

U.S. PATENT DOCUMENTS 4,233,100 * 11/1980 Cunningham et al. ............... 156/260
6,174,403 * 1/2001 Steiner, Jr. et al. .................. 156/260

* cited by examiner

*Primary Examiner*—Richard Crispino
*Assistant Examiner*—Cheryl N. Hawkins
(74) *Attorney, Agent, or Firm*—Bereskin & Parr

(57) ABSTRACT

A method of making a multi-layer laminated shingle, in which a sheet of roofing material is cut into four strips, namely a shim strip, a first narrow tooth strip, a wide tooth strip, and a second narrow tooth strip, all dovetailing with each other. The shim is then laminated below the wide tooth strip to produce a first lamination. The first lamination is slit lengthwise along its center to produce two half first lamination strips. Each half first lamination strip is then laminated below a narrow tooth strip to produce two three layer lamination strips which are cross-cut into shingles. This enables production of a three layer laminated shingle simply and efficiently. In a modified method, two shim strips are used, one at each side of the sheet of roofing material, each being laminated below the wide tooth strip to produce a first lamination as before.

12 Claims, 2 Drawing Sheets

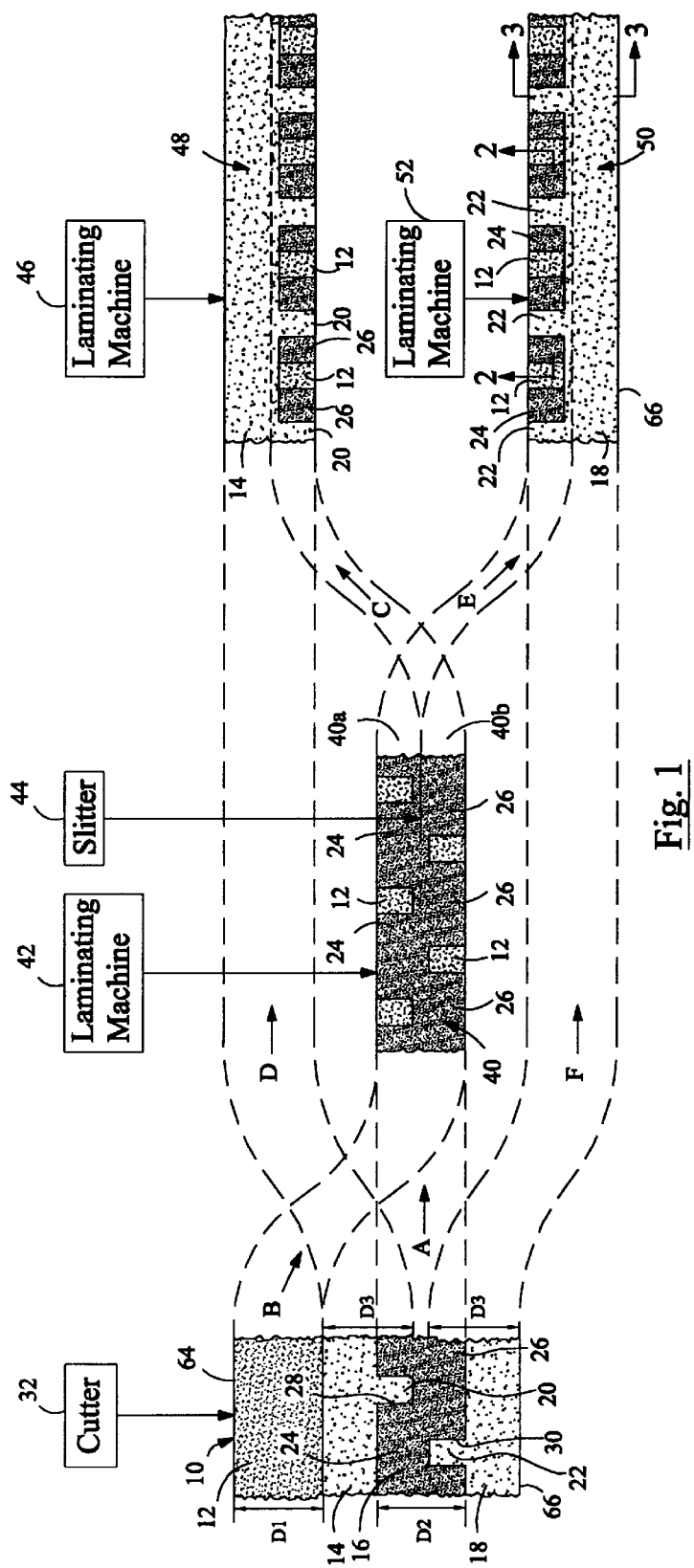

METHOD OF PRODUCING LAMINATED SHINGLE

PRIOR APPLICATION

This application claims the benefit of U.S. Provisional Application Ser. No. 60/094,158 filed Jul. 27, 1998 entitled "METHOD OF PRODUCING LAMINATED SHINGLE".

FIELD OF THE INVENTION

This invention relates to a method of producing a laminated shingle, i.e. a multi-layer shingle.

BACKGROUND OF THE INVENTION

Laminated shingles are very well known and are shown for example in U.S. Pat. No. 5,209,802 to Hannah et al. and U.S. Pat. No. 5,426,902 to Stahl et al. In laminated shingles, several layers of roofing material are laminated together (by a suitable adhesive) to provide an appearance characterized by variations in thickness, which appearance cannot readily be achieved by a single layer shingle. In addition, the different layers can be coated with different color surfacing material and can have cutouts located in various locations to provide an attractive appearance.

While multi-layer laminated shingles have been very well known for many years, they are costly to produce. One of the difficulties is that a number of separate operations must be performed to cutout the pieces which are to be laminated together and then to laminate the pieces together. Often these operations form a batch process rather than a continuous process, slowing the production line and increasing the cost of production.

BRIEF SUMMARY OF THE INVENTION

It is therefore an object of the invention to provide a method of making a multi-layer shingle in which in a preferred embodiment, the operations required to produce the shingle can be carried out continuously and in simple fashion on an assembly line.

In one of its aspects the invention provides a method of making a multi-layer laminated shingle comprising:

(a) cutting at least one sheet of roofing material into at least four strips, said strips comprising at least one shim, first and second narrow tooth strips each having narrow teeth extending from an edge thereof, and a wide tooth strip having a pair of opposed edges each with wide teeth projecting therefrom, (b) laminating said shim or shims below said wide tooth strip to produce a first lamination strip, (c) slitting said first lamination strip longitudinally along its center to produce two half first lamination strips, (d) and laminating each half of first lamination strip below a narrow tooth strip to produce two second lamination strips.

Further objects and advantages of the invention will appear from the following description, taken together with the accompanying drawings.

BRIEF DESCRIPTION OF THE DRAWINGS

In the drawings:

FIG. 1 is a plan view showing an overall method of producing shingles according to the invention;

FIG. 2 is a section taken along line 2—2 of FIG. 1 and showing a portion of a completed shingle according to the invention;

FIG. 3 is a section taken along line 3—3 of FIG. 1 and showing a portion of a completed shingle according to the invention.

DETAILED DESCRIPTION OF PREFERRED EMBODIMENT

Figure 4:
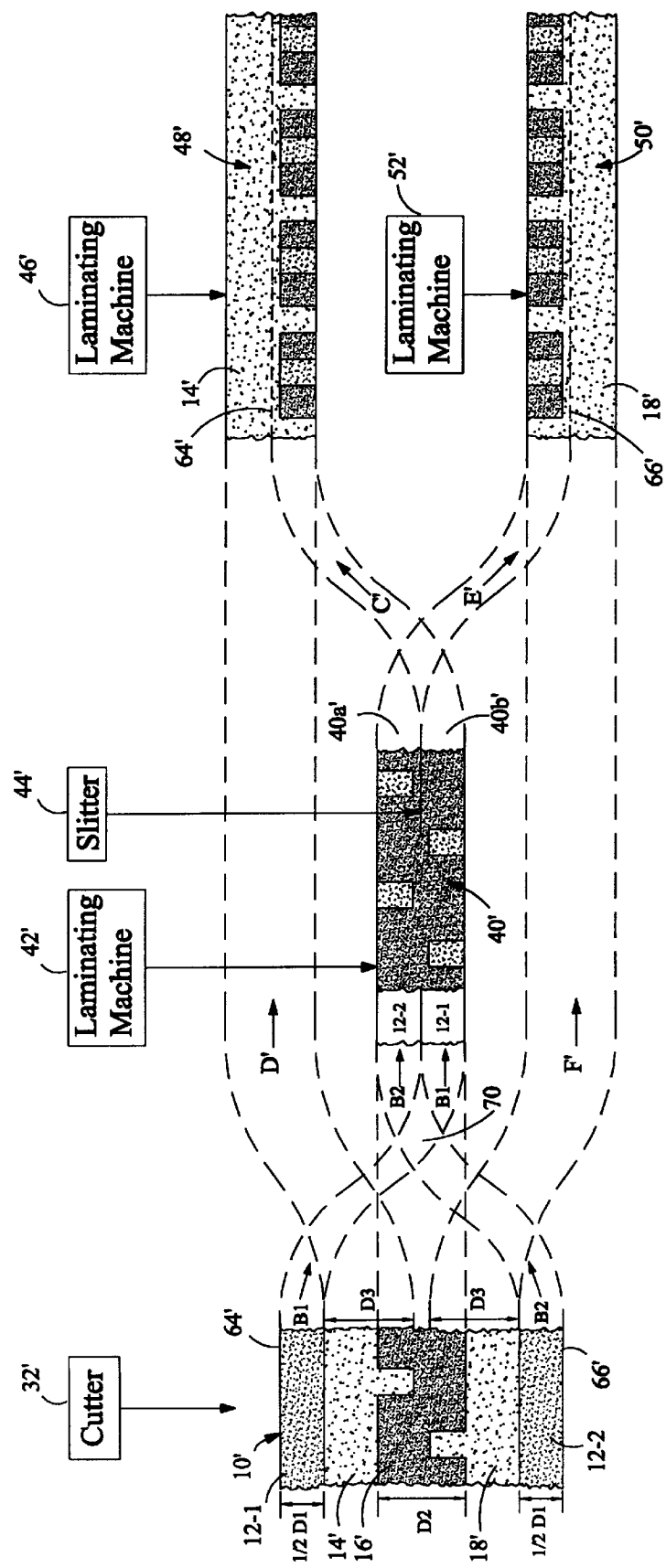
FIG. 4 is a plan view showing a modified method of producing shingles according to the invention.

Reference is first made to FIG. 1, which shows a sheet 10 of conventional roofing material, typically formed of a base mat (either felt or glass fiber) coated with asphalt and with surfacing material such as crushed stone granules applied to the surface thereof. Machines for producing a sheet of such material have been very well known for many years.

The sheet 10 is shown as having been cut lengthwise into (from one side to the other) a shim 12, a narrow tooth strip 14, a wide tooth strip 16, and another narrow tooth strip 18. The narrow tooth strips 14, 18, are so named because each has series of narrow teeth 20, 22 respectively projecting from its inwardly facing edge. The wide tooth strip 16 is so named because it has a set of wide teeth 24, 26 projecting from each of its edges, located between the slots 28, 30 formed when the narrow teeth 20, 22 were cut out. (The narrow tooth strips and the wide tooth strips dovetail so that no material is wasted.) Machines for cutting roofing material in this fashion, or in any other desired fashion, are very well known in the industry, and hence a suitable cutter is indicated diagrammatically at 32. If desired, the spaces between the narrow teeth 20, 22 may be relatively uniform, as may be the widths of the narrow teeth 20, 22 and the widths of the wide teeth 24, 26. However, these are not necessary requirements, and commonly the spaces between the narrow teeth 20, 22 will not be uniform.

In addition, the width D1 of the shim 12 and the width D2 of the wide tooth strip 16 may be about the same, since these two pieces are to be laminated over each other as will be described. However, width D1 and D2 need not necessarily be the same. In addition, each narrow tooth strip 14, 18 has a width D3 (both typically have the same width) which is commonly greater than half of the width D2, but again this is not a necessary requirement.

In the drawings, the shim 12, the narrow tooth strips 14, 18, and the wide tooth strip 16 are shown with different patterns of shading so that these pieces can be easily distinguished in the drawings. In practice, these pieces can have the same or differently colored blends of granules applied to them.

According to the method shown in connection with FIGS. 1 to 3, after the pieces described above have been cut, they are assembled as follows. Firstly, and as shown in FIG. 1, the shim 12 is moved beneath the wide tooth strip 16 (as both move forwardly along paths of travel A for strip 16 and B for shim 12) and is laminated thereto to form a first lamination 40. Such lamination is performed by applying adhesive to the bottom surface of the wide tooth strip 16 and then passing the shim 12 and wide tooth strip 16 through a conventional laminating machine indicated diagrammatically at 42. Such machines are very well known in the industry.

After the first lamination 40 has been formed, it is slit lengthwise down its center by a conventional slitter diagrammatically indicated at 44. This forms two half first lamination strips 40a, 40b.

After the first two half first lamination strips 40a, 40b, have been formed, the right hand strip 40b (as seen along the path of travel of the pieces as indicated by arrow A) is moved to the left (along path C), beneath the left narrow tooth strip 14, which itself moves forwardly along path D, as shown in FIG. 1. These two pieces are then laminated together by applying adhesive to appropriate portions of the lower surface of the narrow tooth strip 14, and passing these two strips through a conventional laminating machine 46. This produces a three layer lamination strip 48 in which the narrow tooth strip 14 forms the upper layer (when on a roof), half the wide tooth strip 16 forms the middle layer, and half the shim 12 forms the lowest layer (when on a roof), as shown in FIGS. 2 and 3. The pieces are arranged lengthwise so that, as shown, in the gaps between the narrow teeth 20, the wide teeth 26 are visible, and in the gaps between the wide teeth formed by the slots 30 (where the narrow teeth 22 were cut out), the shim 12 is visible.

Similarly, the left hand half (with respect to the path of travel A) 40a of the first lamination 40 is moved to the right along path E as shown in FIG. 1 and is laminated to the bottom of the narrow tooth strip 18 to form another three layer laminated strip 50. Strip 18 moves forwardly along path F for this purpose. Again the lamination is performed by a conventional laminating machine diagrammatically indicated at 52, with conventional adhesive used to secure the pieces together.

The three layer laminated strips 48, 50 may then be cross-cut into lengths to form shingles which can be applied to a roof as desired.

A feature of the process described is that it allows the construction of a shingle having a three layer portion, a two layer portion, and a one layer portion, all in one shingle, and in which each layer can if desired be a different color. Since paths A to E are all in a forward direction, with simple sideward movements, the process is relatively simple. It will be realized that any desired granule colors may be used on the different strips shown. For example, the strips can all be coated with granules of the same color, or if desired multiple colors of granules can be deposited lengthwise on the strip. For example, the shim 10 can be one color and the remaining strips can be a different color, producing more than one color in the final combination. Alternatively, different color blend of granules can be run on different lanes. Each lane may then be cut into the strips previously described, with some strips from one lane crossing over and being laminated to some of the strips in the other lane (and vice versa), again producing multiple colors in the final combination.

A minor disadvantage which can occur with the embodiment described in connection with FIGS. 1 to 3 is that when the base sheet 10 is produced using conventional shingle production equipment, the outside edges 64, 66 of the sheet 10 can be rough. If they are rough, then it is preferable that the rough edges be located at the rear or headlap portion of the final shingle rather than at the front edge of the shingle where they will be visible when the shingle is installed on a roof. In the FIGS. 1 to 3 embodiment, outside edge 66 does indeed appear at the rear edge or head-lap portion of shingle 50, as is desired, but outside edge 64 appears at the front edge of shingle 50, where it will be visible (and possibly unsightly) when shingle 50 is installed on a roof.

To avoid this minor disadvantage, the method shown in FIG. 4 may be used. In FIG. 4 primed reference numerals will indicate parts corresponding to those of FIGS. 1 to 3.

In FIG. 4, the full sheet 10' is cut into continuous horizontal lengths (by cutter 32'). The lengths consist (in sequence across the sheet) of half shim 12-1, narrow tooth strip 14', wide tooth strip 16', narrow tooth strip 18', and second half shim 12-2. It will be seen that the only difference from the FIGS. 1 to 3 embodiment is that the shim 12 has been divided lengthwise into two halves (each of equal width), and half the shim has been placed on each side of the remaining strips.

The strips just described are assembled as follows. Half shims 12-1 and 12-2 are moved forwardly along paths B1, B2 respectively so that they move beneath the wide tooth strip 16' and are laminated thereto by laminating machine 42'. It will be noted that half shims 12-1, 12-2 cross over each other, as indicated at 70, before they are laminated beneath the wide tooth strip 16'. This is so that the outside edges 64', 66' will not be located at the front edges of the resultant shingles.

After half shims 12-1, 12-2 are laminated beneath wide tooth strip 16', producing first lamination 40', the first lamination 40' is slit by slitter 44' as before to form two half first lamination strips 40a', 40b'. Then, half lamination strip 40b' is moved sideways along path of travel C', beneath the left narrow tooth strip 14', which again moves forwardly along path D'. These two pieces are laminated together as before using adhesive and a conventional laminating machine 46'. This produces a three layer lamination strip 48' as before, with the outside edge 64' located in the mid portion of the laminated strip 48', near the headlap area and away from the front edge where it would be visible.

Similarly, the other half first lamination strip 40a' is moved sideways along path of travel E', beneath narrow tooth strip 18' to which it is laminated by laminating machine 52'. Again, it will be seen that outside edge 66' is located at the mid portion of resultant triple laminated strip 50', away from the front edge and near the head lap area of that strip. Each laminated strip 48', 50' is then cut into lengths to form shingles, as before.

As an alternative to the method shown in FIG. 4, a different way of avoiding the aforementioned disadvantage is to make the width of shim 12 in FIG. 1 slightly wider than the final desired width and then to trim the outside edge 64, thereby removing any uneven edge portion.

While preferred embodiments of the invention have been described, it will be appreciated that various changes may be made, and such changes are intended to be encompassed in the appended claims.

I claim:

1. A method of making a multi-layer laminated shingle comprising:

(a) cutting at least one sheet of roofing material into at least four strips, said strips comprising at least one shim, first and second narrow tooth strips each having narrow teeth extending from an edge thereof, and a wide tooth strip having a pair of opposed edges each with wide teeth projecting therefrom, (b) laminating said shim or shims below said wide tooth strip to produce a first lamination strip, (c) slitting said first lamination strip longitudinally along its center to produce two half first lamination strips, (d) and laminating each half of first lamination strip below a narrow tooth strip to produce two second lamination strips.

2. A method according to claim 1 wherein said wide tooth strip comprises first and second halves and there is one shim, and wherein said shim and said strips are arranged in the following order across the width of said sheet, from one side to the other: said shim, said first narrow tooth strip, said first half of said wide tooth strip, said second half of said wide tooth strip, and said second narrow tooth strip, one of said half first lamination strips comprising said first half of said wide tooth strip and the other of the said half first lamination strips comprising said second half of said wide tooth strip.

3. A method according to claim 2 wherein in said one half first lamination strip is laminated to said second narrow tooth strip and said other half first lamination strip is laminated to said first narrow tooth strip.

4. A method according to claim 3 wherein in said first lamination strip, said shim is laminated below said wide tooth strip.

5. A method according to claim 4 wherein in each of said second lamination strip, a said half first lamination strip is laminated below a said narrow tooth strip.

6. A method according to claim 1 wherein said wide tooth strip comprises first and second halves and there are first and second shims, and wherein said shims and said strips are arranged in the following order across the width of said sheet, from one side to the other: said first shim, said first narrow tooth strip, said first half of said wide tooth strip, said second half of said wide tooth strip, said second narrow tooth strip, and said second shim, one of said half first lamination strips comprising said first half of said wide tooth strip and said second shim, and the other of said half first lamination strips comprising said second half wide tooth strip and said first shim.

7. A method according to claim 6 wherein each shim has an outside edge and wherein said one half first lamination strip is laminated to said second narrow tooth strip and said other half first lamination strip is laminated to said first narrow tooth strip, thereby producing two multi-layer laminated shingle strips with said outside edges of said shims located in a mid portion of said shingle strips.

8. A method according to claim 7 wherein in said first lamination, said shims are laminated below said wide tooth strip.

9. A method according to claim 8 wherein in each of said second lamination strips, a said half first lamination strip is laminated below a said narrow tooth strip.

10. A method according to claim 1 wherein at least some of said narrow teeth are located over at least some of said wide teeth.

11. A method according to claim 10 wherein each pair of adjacent wide teeth define a gap therebetween, said gap being at a location where said narrow teeth were cut out, said shim being visible through said gap at a plurality of locations in said shingle.

12. A method according to claim 1 wherein at least one base sheet is used comprising at least two colors of surfacing material applied thereto, at least one of said shim or shims, said narrow tooth strip and said wide tooth strip having a different color of surfacing material applied thereto than at least some of the remainder of said shim or shims, said narrow tooth strip and said wide tooth strip.

* * * * *